US012063225B1

United States Patent
Wan et al.

(10) Patent No.: US 12,063,225 B1
(45) Date of Patent: Aug. 13, 2024

(54) SYSTEMS AND METHODS FOR MITIGATING BORDER GATEWAY PROTOCOL ATTACKS IN REAL-TIME

(71) Applicant: CABLE TELEVISION LABORATORIES, INC., Louisville, CO (US)

(72) Inventors: Tao Wan, Ottawa (CA); Michael J. Glenn, Golden, CO (US); Steven J. Goeringer, Westiminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 541 days.

(21) Appl. No.: 17/331,355

(22) Filed: May 26, 2021

Related U.S. Application Data

(60) Provisional application No. 63/029,889, filed on May 26, 2020.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1441* (2013.01)

(58) Field of Classification Search
CPC ............. H04L 63/14–1491; H04L 63/20–205
See application file for complete search history.

(56) References Cited

U.S. PATENT DOCUMENTS

| 2008/0247392 A1* | 10/2008 | White | H04L 45/50 370/392 |
| 2017/0180418 A1* | 6/2017 | Shen | H04L 63/1466 |
| 2021/0105297 A1* | 4/2021 | Beck | H04L 63/0236 |

(Continued)

FOREIGN PATENT DOCUMENTS

CN   109040143 A  * 12/2018  ......... H04L 63/1425

OTHER PUBLICATIONS

Nicholes, Martin O., and Biswanath Mukherjee. "A survey of security techniques for the border gateway protocol (BGP)." IEEE communications surveys & tutorials 11.1 (2009): 52-65. (Year: 2009).*

(Continued)

*Primary Examiner* — Madhuri R Herzog
(74) *Attorney, Agent, or Firm* — Armstrong Teasdale LLP

(57) ABSTRACT

An intelligent border gateway protocol (BGP) device for monitoring and mitigating BGP propagation is provided. The intelligent BGP device includes a transceiver, a processor, and a memory. The transceiver communicates with at least one router over of a communication network. The memory store computer-executable instructions, which, when executed by the processor, cause the intelligent BGP device to store a plurality of historical networking information. The instructions further cause the intelligent BGP device to receive, from a router, a request to analyze an update message, including at least an autonomous system number and a prefix. The instructions also cause the intelligent BGP device to compare the update message to the plurality of historical networking information. In addition, the instructions cause the intelligent BGP device to generate and transmit a probability that the update message is valid based upon the comparison.

20 Claims, 5 Drawing Sheets

(56) References Cited

U.S. PATENT DOCUMENTS

2021/0135982 A1* 5/2021 Chaturmohta .......... H04L 45/28
2021/0160279 A1* 5/2021 Watts ................. H04L 63/1475

OTHER PUBLICATIONS

J. Qiu, L. Gao, S. Ranjan and A. Nucci, "Detecting bogus BGP route information: Going beyond prefix hijacking," 2007 Third International Conference on Security and Privacy in Communications Networks and the Workshops—SecureComm 2007, Nice, France, 2007, pp. 381-390. (Year: 2007).*

* cited by examiner

SYSTEMS AND METHODS FOR MITIGATING BORDER GATEWAY PROTOCOL ATTACKS IN REAL-TIME

CROSS REFERENCE TO RELATED APPLICATIONS

This application claims the benefit of and priority to U.S. Provisional Patent Application 63/029,889, filed May 26, 2020, entitled "SYSTEMS AND METHODS FOR MITIGATING BGP ATTACKS IN REAL-TIME," which is hereby incorporated by reference in its entirety.

BACKGROUND

The field of the invention relates generally to monitoring border gateway protocol (BGP) messages, and more specifically, to monitoring for and mitigating BGP attacks in real-time.

Border gateway protocol (BGP) is primarily subject to two types of attacks including Prefix hijacking and AS_PATH manipulation. Prefix hijacking can occur where one Autonomous System (AS) uses a prefix owned by a separate AS. AS_PATH manipulation can occur where the AS_PATH is modified to mislead routing decisions. Many currently proposed solutions would either require a global public key infrastructure (PKI) or substantial changes to the BGP, making them impractical. Other solutions only provide passive monitoring and could not mitigate attacks in real-time.

BRIEF DESCRIPTION

In one embodiment, an intelligent border gateway protocol (BGP) device for monitoring and mitigating BGP propagation is provided. The intelligent BGP device includes a transceiver configured for operable communication with at least one router of a communication network and a processor including a memory configured to store computer-executable instructions. When executed by the processor computer-executable instructions cause the intelligent BGP device to store a plurality of historical networking information, receive, from a router, a request to analyze an update message, including at least an autonomous system number and a prefix, compare the update message to the plurality of historical networking information, generate a probability that the update message is valid based upon the comparison, and return the probability that the update message is valid to the router.

In another embodiment, a routing device for routing messages on a network is provided. The routing device includes a transceiver configured for operable communication with at least one router and a routing analysis device of a communication network and a processor including a memory configured to store computer-executable instructions. When executed by the processor the computer-executable instructions cause the routing device to store a plurality of message routing information and receive a routing update message from a router. The routing update message includes a prefix and an autonomous system number. The computer-executable instructions also cause the routing device to transmit at least a portion of the routing update message to the routing analysis device, receive, from the routing analysis device, a prediction result based on analysis of the routing update message, and determine whether or not to update the plurality of message routing information with the routing update message based on the prediction result.

In a further embodiments, a method for routing messages on a network is provided. The method includes storing a plurality of message routing information and a plurality of historical networking information and receiving a routing update message from a router. The routing update message includes a prefix and an autonomous system number. The method further includes comparing the routing update message to the plurality of historical networking information, generating a probability that the routing update message is valid based upon the comparison, and determining whether or not to update the plurality of message routing information with the routing update message based on the probability that the routing update message is valid.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
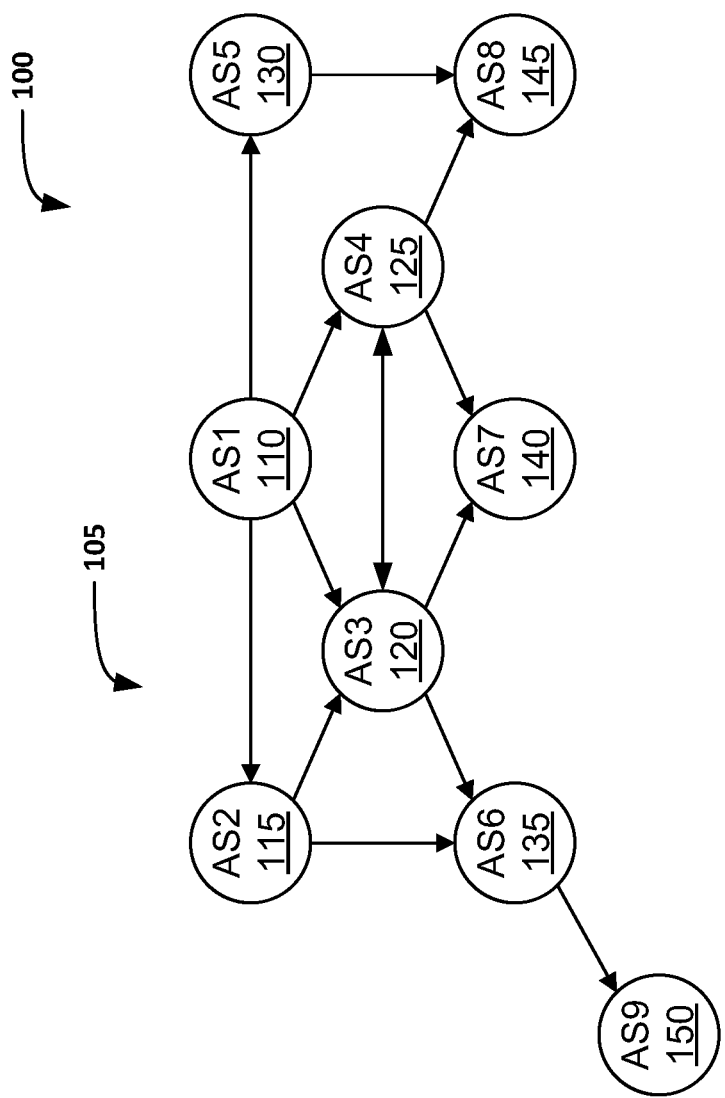
FIG. 1 illustrates a computer network using the Border gateway protocol (BGP) in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The field of the invention relates generally to monitoring border gateway protocol (BGP) messages, and more specifically, to monitoring for and mitigating BGP attacks in real-time. For ease of explanation, the following description may generically refer to these innovative embodiments as "intelligent BGP." The intelligent BGP system herein enables the routers and other network systems to detect and mitigate BGP attacks in real-time without having to make changes to how BGP works. In particular, the present embodiments may include one or more of an entity that collects network data (e.g., messages, traffic, routes, etc.), such as a gateway, router, and/or controller.

An intelligent BGP system monitors historical AS prefix ownership and AS_PATH validity to detect when BGP updates are incorrect, such as from being compromised. In at least one embodiment, gateways and/or routers can receive BGP updates from other gateways and/or routers. BGP updates include at least a BGP prefix for a specific set of IP addresses, an AS number that represents a location or owner of those set of IP addresses, and an AS_PATH that includes a route to the location or owner. However, this information can be misused by malicious actors to cause messages to be misrouted, such as part of a denial of service attack. In normal circumstances, BGP updates are propagated from different gateways or routers to help other gateways and routers with routing messages. The gateways and/or routers can determine routing paths for their messages based on the information provided in the BGP updates.

The intelligent BGP system stores a plurality of historical BGP update information. This historical information includes a plurality of historical BGP update messages including BGP prefixes and associated AS_PATHs. Based on this historical information, the intelligent BGP system can determine associations between different address sets and BGP prefixes. The intelligent BGP system also receives real-time BGP updates from gateways and/or routers for validation. The intelligent BGP system compares the received BGP update with the historical information to provide validation information to the gateway and/or router that transmitted the BGP update. Based on the validation information, the gateway and/or router determines what action to take for the BGP update, such as, but not limited to, accept, reject, and/or delay.

In some embodiments, the intelligent BGP system calculates a probability that the provided AS number in the update owns the provided prefix. The probability is based on the historical ownership of the provided prefix. For example, if Prefix 1 has been associated with AS number 1 in BGP updates for the last three months, then a BGP update with Prefix 1 being associated with AS number 1 would have a high probability of being valid. However, if the intelligent BGP system receives a BGP update indicating Prefix 1 is associated with AS number 2, then the probability will be low that the BGP update is valid. However, there is a possibility that Prefix 1 has been reassigned to AS number 2. Therefore, the intelligent BGP system checks to see when the last BGP update with Prefix 1 assigned to AS number 1 and makes a probability determination based on the difference in time. The gateway and/or router can then determine whether or not to accept the update based on one or more stored policies.

If no other AS number is claiming or has claimed the prefix, then the intelligent BGP system associates that AS number with the prefix. If there is a conflict then the probabilities for each AS number that is claiming the prefix are compared to determine which claim is most probable.

The intelligent BGP system can be a separate server or computer system that the gateways and/or routers are in communication with. Slave, proxy, cached, and duplicate versions of the intelligent BGP system can be deployed to provide resilience and accessibility to the intelligent BGP service. Furthermore, the intelligent BGP system can also be associated with an individual router and/or gateway or with an autonomous system (AS).

FIG. 1 illustrates a computer network 100 using the Border gateway protocol (BGP) in accordance with at least one embodiment.

The BGP allows for the dissemination and propagation of address and routing information throughout internal and external networks without requiring intimate knowledge of the networks in question. For the purposes of BGP, networks (and the Internet) are divided into autonomous systems (AS), which are each a collection of connected Internet Protocol (IP) routing prefixes under the control of one or more network operators, usually on behalf of a single administrative entity or domain that presents a common, clearly defined routing policy. A unique AS number (ASN) is allocated to each AS for use in BGP routing. The ASNs are used to uniquely identify each network on the Internet. Accordingly, it is important that the information provided for BGP routing is accurate.

Malicious actors can disrupt BGP routing by prefix hijacking and AS_PATH manipulation, which can be used for malicious actions, such as denial of service attacks and man-in-the-middle attacks.

Network 100 includes a plurality of Autonomous Systems 105, where each AS represents a collection or set of IP addresses. For example, AS1 110 includes 255 IP addresses that can be represented as 1.1.1.0/24. For a BGP update, a router associated with AS1 110 transmits a BGP update to neighboring autonomous systems 105: AS2 115, AS3 120, AS4 125, and AS5 130. The BGP update includes the address range in AS1 110, a prefix assign to the autonomous system 105 (AS1), the AS number 1, and the AS_PATH to reach AS1 110. These can be represented as ASN1(1.1.1.0/24, #1), showing that AS1 includes the address range and that AS1 is one step away. Each one of the receiving autonomous systems 105 store the update, such as by an external facing router. Then the BGP update is updated and transmitted to the next set of neighboring autonomous systems 105.

For example, AS2 115 updates AS_PATH of the BGP update for AS1 110 to say that AS1 110 is reachable through AS2 115-ASN1(1.1.1.0/24, {#2, #1}). AS2 115 then transmits this BGP update to the connected autonomous systems 105: AS3 120 and AS6 135. In the case of AS3 120, the BGP update is compared to the stored information for AS1 110. Since the path to AS1 110 provided by AS2 115 is longer than the currently stored path, AS3 120 discards the BGP update received from AS2 115. AS6 135 receives BGP updates from both AS2 115 and AS3 120. The AS_PATH from AS2 115 is {#2, #1} and the AS_PATH from AS3 120 is {#3, #1}. Since the AS_PATHs are the same length, then AS6 135 determines which AS_PATH to use for reaching AS1 110. In the exemplary embodiment, AS6 135 makes this determination based on one or more stored preferences or policies. For example, AS6 135 can compare the latency between itself and both AS2 115 and AS3 120 and make the determination based on the comparison. In another example, AS6 135 can compare the costs of routing through AS2 115 versus AS3 120 and make the determination on that comparison or a combination of comparisons. In this example AS6 135 makes the determination to use and store the AS_PATH from AS2 115. Then AS6 135 transmits BGP updates to its neighboring autonomous systems 105. Accordingly, AS6 135 transmits a BGP update (ASN1

(1.1.1.0/24, {#6, #2, #1})) to AS9 150 and AS3 120. AS3 120 discards the BGP update due to the length of the AS_PATH compared to its stored AS_PATH for AS1 110. AS9 150 receives the BGP update and stores the AS_PATH {#6, #2, #1} for AS1 110.

AS1 110 periodically transmits further BGP updates, which would be the same as the previous BGP update if nothing has changed. The other autonomous systems 105 receive these BGP updates and compare them to their stored BGP updates. If nothing has changed then the BGP might only store the updated timestamp of the BGP updates. The autonomous systems 105 retransmit and propagate the new BGP updates.

Additionally, each other autonoumous system also sends out BGP updates for its addresses. For example, AS8 145 would also transmit a BGP update to AS4 125 and AS5 130. In this example, this BGP update could read ASN8(8.8.8.0/24, #8). In this example, AS1 110 has the AS_PATH for AS8 stored as ASN8(8.8.8.0/24, {#4, #8}).

One issue with above system is that the system does not verify that the prefixes and routing information is correct in the BGP updates. For example, AS1 110 could broadcast AS8(8.8.8.0/24, {#1, #8}). This would state that the IP address range of AS8 145 could be reached one hop away from AS1 110, which is not correct. However, this BGP update could trick different autonomous systems 105, such as AS2 115 into routing to AS8 145 through AS1 110 because the route appears shorter. Furthermore, AS1 110 could pretend to be AS8 145. This allows AS1 110 to hijack traffic and force it to be routed through AS1 110 instead of the shortest route. The hijacked traffic might still be routed to AS8 145 or might be stopped at AS1 110.

Figure 2:
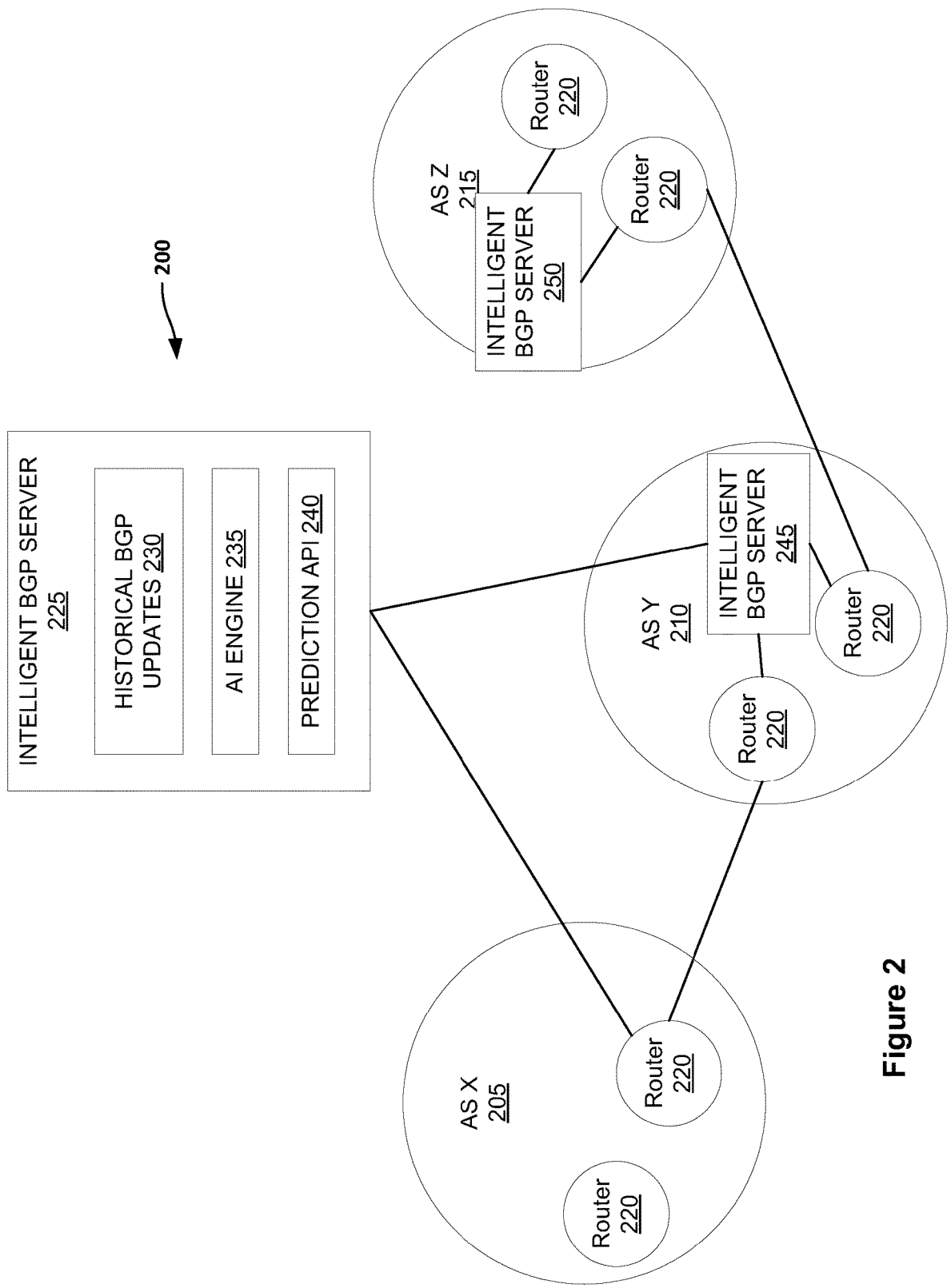
FIG. 2 illustrates an intelligent BGP system in accordance with at least one embodiment.

FIG. 2 illustrates an intelligent BGP system 200 in accordance with at least one embodiment. The intelligent BGP system 200 provides confidence and/or credibility information about the BGP updates to allow the routers of the various autonomous systems 105 (shown in FIG. 1) to decide which BGP updates to use and which to ignore. For illustration purposes, the intelligent BGP system 200 includes three autonomous systems: AS X 205, AS Y 210, and AS Z 215.

Each autonomous system 105, AS X 205, AS Y 210, and AS Z 215, includes one or more externally facing routers 220 that allow the autonomous system 105 to communicate with other autonomous systems 105. In the exemplary embodiment, each autonomous system 105, AS X 205, AS Y 210, and AS Z 215 includes multiple routers that all use the same AS number, but each has externally facing routers 220 that connect to routers 220 with other AS numbers. Each autonomous system 105, AS X 205, AS Y 210, and AS Z 215, illustrates a different potential configuration for the intelligent BGP system 200. AS X 205 is in communication with an external intelligent BGP server 225. AS Y 210 includes intelligent BGP server 245, which can be a slave, clone, and/or cache version of the external intelligent BGP server 225. The intelligent BGP server 245 in AS Y 210 is in communication with the external intelligent BGP server 225. AS Z 215 includes its own intelligent BGP server 250. The intelligent BGP server 250 can be a duplicate of the external intelligent BGP server 225.

In the exemplary embodiment, the intelligent BGP server 225 includes at least historical BGP updates 230, an artificial intelligence (AI) engine 235, and a prediction application programming interface (API) 240. The historical BGP updates 230 can includes a database of past BGP updates that have been received by different autonomous systems 105. The historical BGP updates 230 can include both a starter database (which can be from publicly available sources) or listing of historical BGP update messages and BGP update messages received by autonomous systems 105 that the intelligent BGP server 225 is in communication with. These BGP update messages can have been transmitted to the intelligent BGP server 225 for analysis as described herein. The AI engine 235 is used to analyze BGP update messages and determine how credible these BGP update messages are. This includes determining the probability that a particular BGP update message is accurate. The AI engine 235 includes a prediction model for prefix ownership and AS_PATH validity. The prediction API 240 communicates with routers 220 from various autonomous systems 105 to receive BGP update messages to analyze and to return the likelihood that the prefix ownership and AS_PATH are correct.

For example, router 220 of AS X 205 receives a BGP update message. The router 220 transmits the BGP update message to the intelligent BGP server 225 using the prediction API 240. The AI engine 235 uses the historical BGP updates 230 to determine the validity of the prefix ownership and the AS_PATH. The prediction API 240 returns the validity results to the requesting router 220. The requesting router then uses the validity results to determine whether or not to use the BGP update. The requesting router 220 can use policy information to assist in making that determination. In some embodiments, the intelligent BGP server 225 also stores the analyzed BGP update message in the historical BGP updates 230.

In another example, router 220 of AS Y 210 receives a BGP update message. The router 220 transmits the BGP update message to the local intelligent BGP server 245 using the prediction API 240. In some embodiments, the local intelligent BGP server 245 includes a copy of the AI engine 235 and performs the analysis. In these embodiments, the external intelligent BGP server 225 updates at least one of the historical BGP updates 230 and the AI engine 235 for the local intelligent BGP server 245. In other embodiments, the local intelligent BGP server 245 directly connects to the external intelligent BGP server 225 and routes the BGP update message to the external intelligent BGP server 225 for analysis. The prediction API 240 returns the validity results to the requesting router 220. The requesting router 220 then uses the validity results to determine whether or not to use the BGP update. The requesting router 220 can use policy information to assist in making that determination. In some embodiments, the local intelligent BGP server 245 also stores the BGP update message in the historical BGP updates 230, either locally or with the external intelligent BGP server 225.

In a further example, router 220 of AS Z 215 receives a BGP update message. The router 220 transmits the BGP update message to the local intelligent BGP server 250 using the prediction API 240. The local intelligent BGP server 225 is a copy of the external intelligent BGP server 225. The AI engine 235 and performs the analysis. In some embodiments, the local intelligent BGP server 250 receives updates from the external intelligent BGP server 225. In other emboidments, the local intelligent BGP server 250 has no further communication with the external intelligent BGP server 250 and the local intelligent BGP server 250 acts on its own. In some further embodiments, the local intelligent BGP server 250 is a part of the router 220. In other embodiments, the local intelligent BGP server 250 is separate and in communication with the router 220. The prediction API 240 returns the validity results to the requesting router 220. The requesting router then uses the validity results to determine whether or not to use the BGP update. The requesting router 220 can use policy information to assist in making that determination. In some embodiments, the local intelligent BGP server 250 also stores the BGP update message in the local historical BGP updates 230.

The above examples illustrate different ways of deploying intelligent BGP servers 225, 245, and 250 in the intelligent BGP system 200. In practice, the intelligent BGP system 200 can have some or all of the functionality of the various intelligent BGP servers 225, 245, and 250 described herein. The external intelligent BGP server 225 can be used in situations where a network includes multiple AS numbers. In this situation, a single intelligent BGP server 225 can be used to centrally monitor the different autonomous systems 105.

Figure 3:
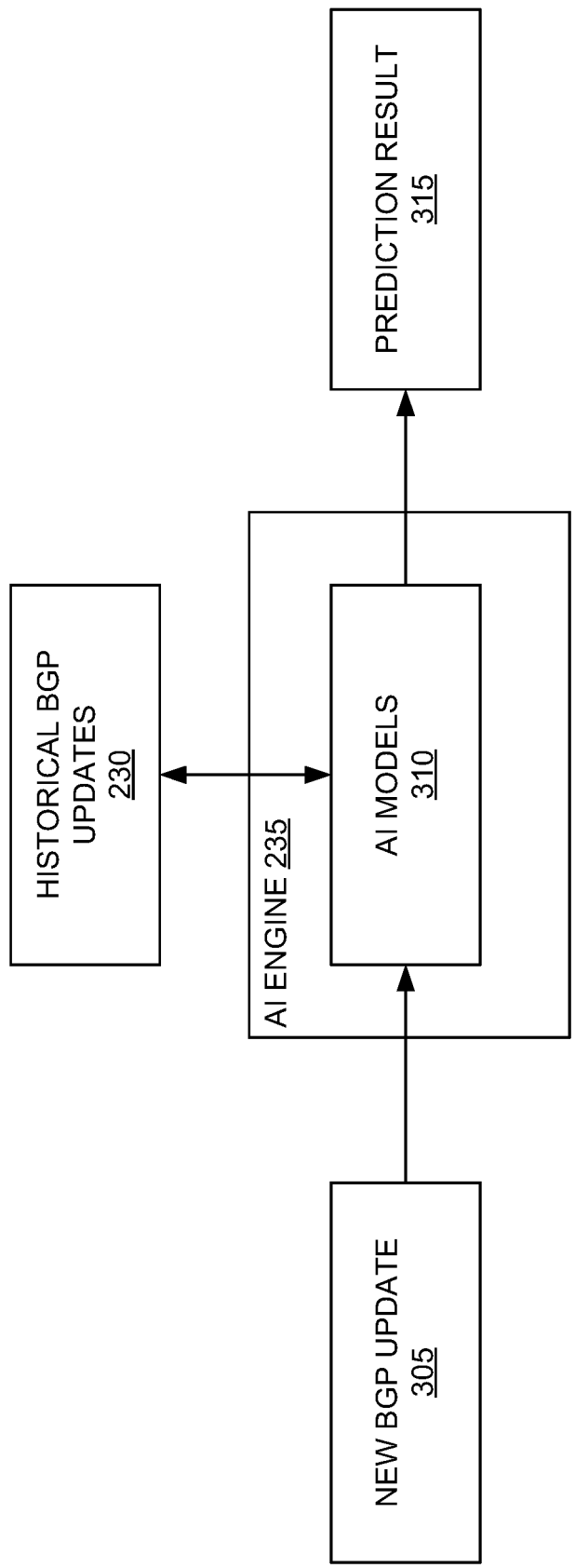
FIG. 3 illustrates an artificial intelligence engine for use with the intelligent BGP system shown in FIG. 2.

FIG. 3 illustrates an artificial intelligence (AI) engine 235 for use with the intelligent BGP system 200 (shown in FIG. 2). In the exemplary embodiment, the AI engine 235 includes a plurality of AI models 310 that have been trained using the historical BGP updates 230. The AI models 310 model the different configurations of autonomous systems 105 (shown in FIG. 1) and how each has related to different AS numbers as well as the AS_PATHs to reach each. The AI models 310 can include multiple models to predict ownership and AS_PATH validity, such as, but not limited to, Bayesian networks and other models. The models can be generated and/or maintained by machine learning and other artificial intelligence techniques.

When a new BGP update 305 is received, such as through the prediction API 240 (shown in FIG. 2), the new BGP update 305 is analyzed by the AI models 310 in the AI engine 235. In the exemplary embodiment, the AI models 310 use a plurality of rules to analyze the new BGP update 305 in view of the historical BGP updates 230. Then the AI engine 235 calculates a prediction result 315 that includes the probability that the prefix is owned by the listed AS number and/or that the provided AS_PATH is correct. The prediction result 315 is provided to the requesting router 220 (shown in FIG. 2) through the prediction API 240.

For the analysis performed by the AI engine 235, the first rule is that any AS is allowed to claim ownership of any prefix. This matches the current rules of BGP. For the purposes of this analysis, the following equation can be used to determine predictive probabilities.

$$p(f_i, A_j | t_0) = 1 \qquad \text{Equation 1}$$

where $f_i$ is the prefix, $A_j$ is the AS number, and $t_i$ is a time unit with to being the current time. Thus Equation 1 represents the probability that Aj owns $f_i$ at time $t_k$ (e.g., to is the current time and $t_k$ is the $k^{th}$ day (or week or hour) in the past from to). Based on the first rule, if a prefix $f_i$ has not been used by any autonomous system 105 in any previous BGP update, then AI engine 235 accepts the connection listed in the new BGP update 305 as trusted and valid.

If the prefix has been used in the past, then the AI engine 235 determines the probability that the prefix $f_i$ is owned by the AS number based on the historical ownership of the prefix $f_i$. Equation 2 illustrates the credibility of the claim.

$$p_T(f_i, A_j) = [p(f_i, A_j | t_1) + p(f_i, A_j | t_2) + \ldots + p(f_i, A_j | t_n)]/N \qquad \text{Equation 2}$$

where $p_T(f_i, A_j)$ represents the credibility in the form of accumulated probability that A own f based on its historical ownership off. Equation 2 can be further modified to adjust the probability of historical ownership by weighting the terms of Equation 2 so that more recent ownership has a higher weight.

The AI engine 235 compares the credibility of each when the ownership of a prefix $f_i$ is in dispute. For example, k represents one AS number and j represents another, different AS number, such that:

$$p(f_i, A_j | t_0) = 1 - \text{SUM}\{p_T(f_i, A_k)\}, \text{where } k! = j \qquad \text{Equation 3}$$

In this case, the AI engine 235 compares the different probabilities and returns a prediction result 315 that includes a probability that the AS number in the new BGP update 305 owns the prefix $f_i$. Based on Equation 3, if no AS number has claimed a prefix in the past, then the claim of ownership in the new BGP update 305 is trusted and the prediction result 315 would be 1. If the prefix being claimed by a first AS number has always been claimed by another party (or parties), the claim of ownership in the new BGP update 305 is not trusted and the prediction results 315 would be 0. In a situation where a prefix was bought or transferred to another party, where the previous party is no longer advertising the connection, the weighted version of Equation 2 would put the claimed prefix with the new owner. Especially if there has been some time since the previous owner advertised the prefix.

While the above system 200 describes receiving the new BGP update 305, in some embodiments, the intelligent BGP server 225 only receives a portion of the new BGP update 305. For example, the system 200 can receive the prefix, AS number, and AS_PATH from the new BGP update 305 and use that information to generate the prediction results 315.

In the exemplary embodiment, the AI engine 235 uses machine learning (ML) and/or other artificial intelligence to generate the AI models 310.

Furthermore, the AI engine 235 uses ML to update the AI models 310 based on new information, such as new BGP updates 305 and corresponding prediction results 315. The ML can also use the AI models 310 recognize patterns of behavior from the new BGP updates 305, such as, but not limited to, malicious actors and potential cybersecurity events (e.g., denial of service and man in the middle attacks).

Figure 4:
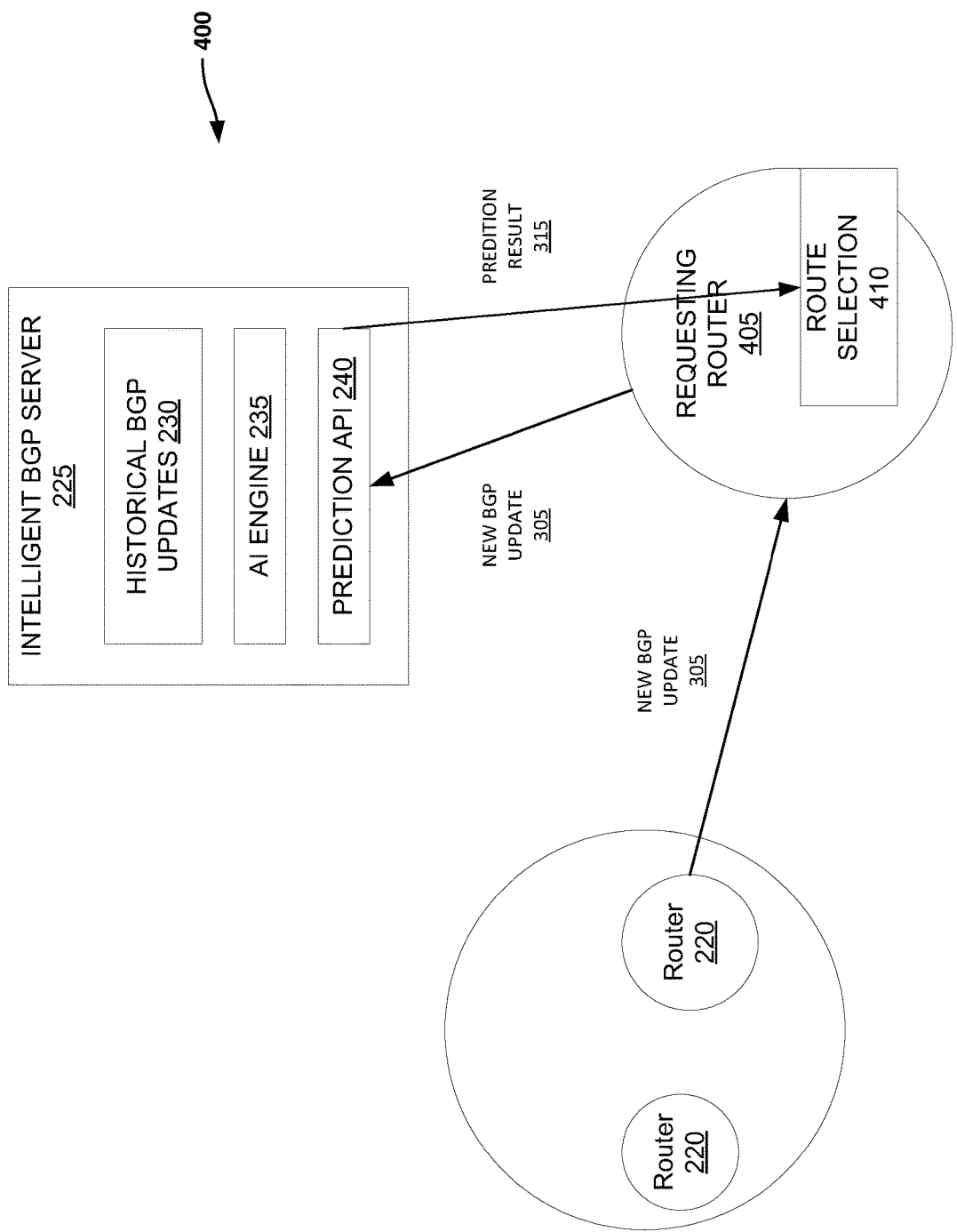
FIG. 4 illustrates data flow diagram of a process for route selection using the intelligent BGP system shown in FIG. 2.

FIG. 4 illustrates data flow diagram of a process 400 for route selection using the intelligent BGP system 200 (shown in FIG. 2). In process 400, a router 220 transmits S410 a new BGP update 305 to a requesting router 405. The requesting router 405 transmits S415 the new BGP update 305 to the intelligent BGP server 225. The intelligent BGP server 225 analyzes the new BGP update 305, such as shown in FIG. 3, and returns S420 a prediction result 315 to the requesting router 405. The requesting router 405 includes a route selection component 425 and uses the prediction result 315 to determine whether or not to accept the routing information provided in the new BGP update 305. In some embodiments, the route selection component 425 uses policy information or other stored preferences and/or rules to make the determination in view of the prediction results 315. For example, the route selection component 425 decides not to accept the new BGP update 305 when the probabilities provided by the prediction result 315 are below a specific threshold. The threshold can vary between different AS numbers based on the requesting router's preferences and/or policies. For example, AS numbers within a particular range are generally untrusted or routes through a specific range of AS number are to be avoided. This can include the trade off of longer routes versus more trusted routes.

Figure 5:
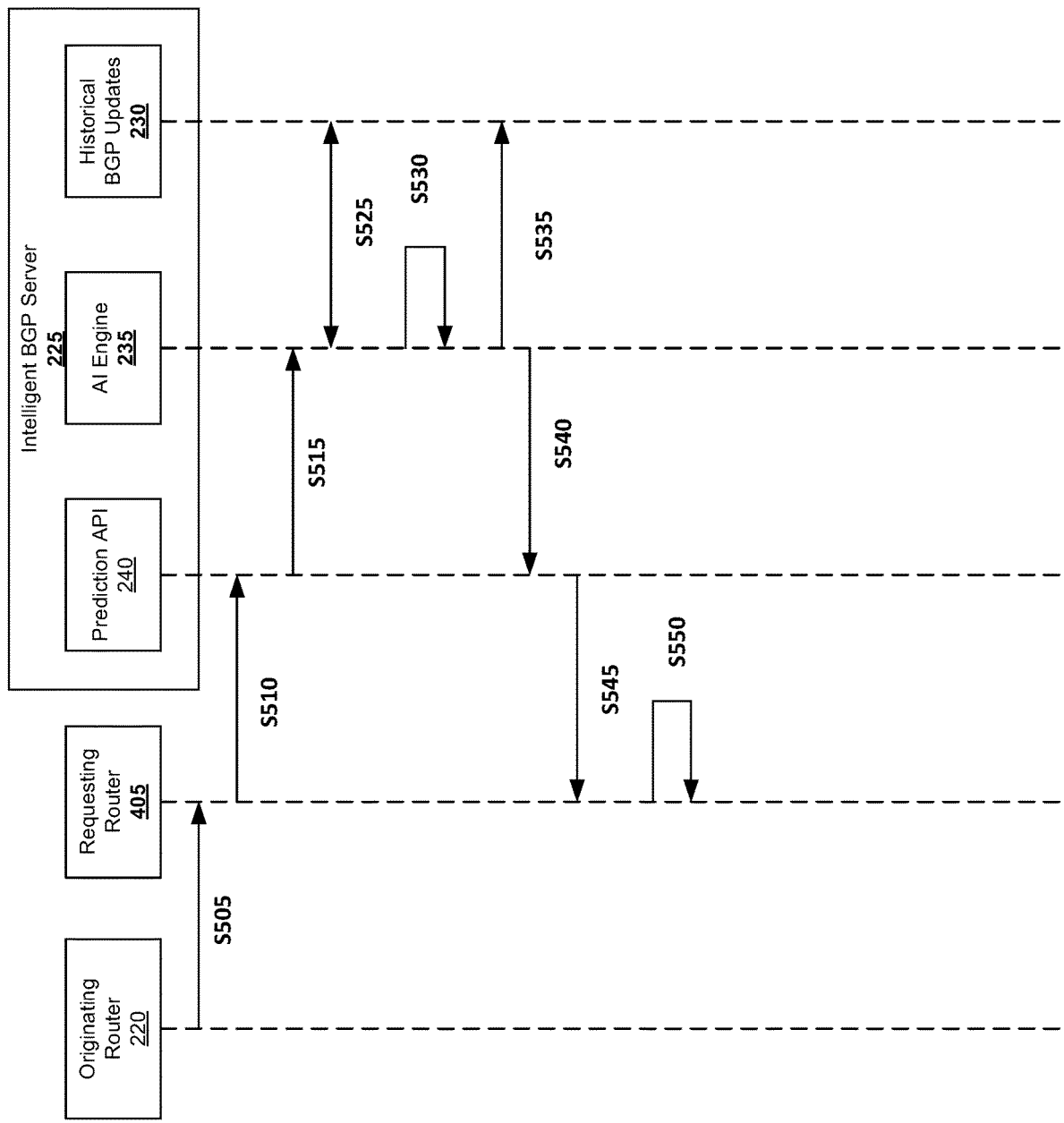
FIG. 5 illustrates a timing diagram of a process for intelligent BGP analysis using the system shown in FIG. 2.

FIG. 5 illustrates a timing diagram of a process 500 for intelligent BGP analysis using the system 200 (shown in FIG. 2). In step S505, an originating router 220 transmits a new BGP update 305 (shown in FIG. 3). The new BGP update 305 includes a prefix, an AS Number, and an AS_PATH and is transmitted as a part of normal BGP address propagation. In the exemplary embodiment, the originating router 220 transmits the new BGP update 305 to all connected routers that have different AS numbers. One of those connected routers is requesting router 405. In step S510, requesting router 405 transmits the new BGP update 305 to the intelligent BGP server 225 for analysis. In some embodiments, the requesting router 405 transmits the entire new BGP update message 305. In other embodiments, the requesting router 405 transmits only the important information, such as the prefix, AS number, and AS_PATH. The information is transmitted to the Prediction API 240 that acts as an intermediary to handle communication between the requesting routers 405 and the intelligent BGP server 225.

In step S515, the information for the new BGP update 305 is transferred to the AI engine 235. In some embodiments, in step S525, the AI engine 235 accesses a database of historical BGP updates 230 to use historical data in the analysis. In some other embodiments, the historical BGP updates 230 are integrated into the AI engine 235, such as in one or more AI models 310 (shown in FIG. 3). In step S530, the AI engine 235 analyzes the provided information for the new BGP update 305 to determine a probability that the new BGP update 305 is valid. This probability is based, at least in part, on historical BGP updated data. The probability and other information is stored in a prediction result 315 (shown in FIG. 3). In some embodiments, in step S535, the new BGP update 305 is stored in the historical BGP updates 230.

In step S540, the prediction result 315 is provided to the prediction API 240. In step S545, the prediction result 315 is provided to the requesting router 405. In step S550, the requesting router 405 uses the prediction result 315 to determine whether or not to accept new BGP update 305 provided by the originating router 220. In the exemplary embodiment, the requesting router 405 compares one or more probabilities from the prediction result 315 to one or more policies or settings for the autonomous system 105 (shown in FIG. 1) associated with the requesting router 405. In other embodiments, the intelligent BGP server 225 stores the policy and setting information for one or more autonomous systems 105. In these embodiments, the prediction result 315 returns whether or not the requesting router 405 should accept the new BGP update 305.

In some embodiments, the requesting router 405 can accept, decline/ignore, and delay the new BGP update 305. When the requesting router 405 accepts the new BGP update 305, the requesting router 405 updates its routing information based on the information provided by the new BGP update 305. The requesting router 405 would then update the routing information (e.g., AS_PATH) with its information and then transmit the updated new BGP update 305 to its neighboring routers 220. When the requesting router 405 declines/ignores the new BGP update 305, the requesting router 405 discards the new BGP update 305. When the requesting router 405 delays the new BGP update 305, the requesting router 405 delays making a decision about the new BGP update 305. In this situation, the requesting router 405 waits for more new BGP updates 305 before making a decision, such as by waiting to see if future new BGP updates 305 match or confirm the information in the original new BGP update 305.

The intelligent border gateway protocol (BGP) device 235 is configured for monitoring and mitigating BGP propagation. The intelligent BGP device 235 includes a transceiver configured for operable communication with at least one router 220 of a communication network 100. The intelligent BGP device 225 also includes a processor including a memory configured to store computer-executable instructions. The intelligent BGP device 225 is programmed to store a plurality of historical networking information, such as in historical BGP updates 235. The intelligent BGP device 225 receives, from a router 220, a request to analyze an update message 305, where the update message 305 is a border gateway protocol update message that includes at least an autonomous system number and a prefix.

The intelligent BGP device 225 compares the update message 305 to the plurality of historical networking information 230. The intelligent BGP device 225 generates a probability that the update message 305 is valid based upon the comparison. In some embodiments, the intelligent BGP device 225 generates the probability that the update message 305 is valid based on whether or not the prefix is found in the plurality of historical networking information 230.

The intelligent BGP device 225 returns the probability that the update message 305 is valid to the router 220, such as in prediction result 315. The update message 305 also includes routing information for the autonomous system number (e.g., AS_PATH). The probability that the update message 305 is valid is based, at least in part, on the routing information. The intelligent BGP device 225 updates the plurality of historical networking information 230 with the update message 305.

The router 220 is configured to determine whether or not to accept the update message 305 based on the probability that the update message is valid.

A routing device 405 for routing messages on a network 100 includes a transceiver configured for operable communication with at least one router 220 and a routing analysis device 225 of a communication network 100. The routing device 405 also includes a processor including a memory configured to store computer-executable instructions. The instructions when executed by the processor cause the routing device 405 to store a plurality of message routing information. The routing device 405 receives a routing update message 305 from a router 220, where the routing update message is a border gateway protocol update message that includes a prefix, routing information, and an autonomous system number. The routing device 405 transmits at least a portion of the routing update message 305 to the routing analysis device 225. The routing device 405 receives, from the routing analysis device 225, a prediction result 315 based on analysis of the routing update message 305. The prediction result 315 includes a probability that the routing update message 305 is valid. The routing device 405 determines whether or not to update the plurality of message routing information with the routing update message 305 based on the prediction result 315.

In some embodiments, the routing device 405 stores one or more routing policies. The routing device 405 determines whether or not to update the plurality of message routing information based on the prediction result 315 and the one or more routing policies.

In some embodiments, the routing update message 305 is a first routing update message 305 including a first prefix and a first autonomous system number. The routing device 405 receives a second routing update message 305 including the first prefix and a second autonomous system number. The first autonomous system number is different from the first autonomous system number. The routing device 405 determines whether to update the plurality of message routing information with the first routing update message 305 or the second routing update message 305. In some further embodiments, the routing device 405 receive a first prediction result 315 for the first routing update message 305 and a second prediction result 315 for the second routing update message 305. The routing device 405 determines whether to update the plurality of message routing information with the first routing update message 305 or the second routing update message 305 based on the first prediction result 315 and the second prediction result 315.

In some embodiments, the routing device 405 determines whether or not to propagate the routing update message 305. In these embodiments, the routing device 405 updates routing information in the routing update message 305. Then the routing device 405 transmits the updated routing update message 305 to one or more neighboring routing devices 220.

In still further embodiments, a method for routing messages on a network 100 is performed by the intelligent BGP server 225 and a requesting router 405. The method includes storing a plurality of message routing information and a plurality of historical networking information. The requesting router 405 receives a routing update message 305 from a router 220. The routing update message 305 is a border gateway protocol update message including a prefix, an autonomous system number, and routing information for the autonomous system number. The requesting router 405 transmits the routing update message 305 to the intelligent BGP server 225. The intelligent BGP server 225 compares the routing update message 305 to the plurality of historical networking information 230. The intelligent BGP server 225 generates a probability that the routing update message 305 is valid based upon the comparison. The intelligent BGP server 225 transmits the probability in a prediction result 315 to the requesting router 405. The requesting router 405 determines whether or not to update the plurality of message routing information with the routing update message 305 based on the probability that the routing update message 305 is valid.

In some embodiments, the requesting router 405 determines whether or not to propagate the routing update message 305. In these embodiments, the requesting router 405 updates routing information associated with the routing update message 305. Then the requesting router 405 transmits the updated routing update message to one or more neighboring routing devices.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity of broadcast messages and timestamps at the server-side, and by further enabling the easier and more efficient verification of a received broadcast message at the client-side. The present embodiments therefore improve the speed, efficiency, and reliability in which such determinations and processor analyses may be performed. Due to these improvements, the aspects described herein address computer-related issues that significantly improve the security of broadcasting messages in comparison with conventional techniques. Thus, the aspects herein may be seen to also address computer-related issues such as communication security between electronic computing devices or systems, for example.

Exemplary embodiments of systems and methods for broadcast messaging protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

In some embodiments, the design system is configured to implement machine learning, such that the neural network "learns" to analyze, organize, and/or process data without being explicitly programmed. Machine learning may be implemented through machine learning (ML) methods and algorithms. In an exemplary embodiment, a machine learning (ML) module is configured to implement ML methods and algorithms. In some embodiments, ML methods and algorithms are applied to data inputs and generate machine learning (ML) outputs. Data inputs may include but are not limited to: analog and digital signals (e.g. sound, light, motion, natural phenomena, etc.) Data inputs may further include: sensor data, image data, video data, and telematics data. ML outputs may include but are not limited to: digital signals (e.g. information data converted from natural phenomena). ML outputs may further include: speech recognition, image or video recognition, medical diagnoses, statistical or financial models, autonomous vehicle decision-making models, robotics behavior modeling, fraud detection analysis, network routing decision, user input recommendations and personalization, game AI, skill acquisition, targeted marketing, big data visualization, weather forecasting, and/or information extracted about a computer device, a user, a home, a vehicle, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, recurrent neural networks, Monte Carlo search trees, generative adversarial networks, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising data associated with events that occurred, generate a model which maps the data preceding the event to data about when and where the event occurred, and generate predictions of when that event may occur again in the future based on current data. In another example, a further ML module may receive training data comprising historical routing information, generate one or more models that maps the accuracy of the received routing information, and generate predictions about the accuracy of new routing information in view of those models.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module coupled to or in communication with the design system or integrated as a component of the design system receives unlabeled data comprising event data, financial data, social data, geographic data, cultural data, and political data, and the ML module employs an unsupervised learning method such as "clustering" to identify patterns and organize the unlabeled data into meaningful groups. The newly organized data may be used, for example, to extract further information about the potential network routers.

In yet another embodiment, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict optimal constraints.

In some embodiments, the ML module may determine that using one or more variables in one or more models are unnecessary in future iterations due to a lack of results or importance. Furthermore, the ML module may recognize patterns and be able to apply those patterns when executing models to improve the efficiency of that process and reduce processing resources. In some embodiments, ML modules may be executed on ML training computational units customized for ML training. For example, in some embodiments, tensor processing units (TPUs) may be used for ML training.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An intelligent border gateway protocol (BGP) device for monitoring and mitigating BGP propagation, comprising:
   a transceiver configured for operable communication with at least one router of a communication network;
   a processor including a memory configured to store computer-executable instructions, which, when executed by the processor, cause the intelligent BGP device to:
   store a plurality of historical networking information;
   receive, from a router, a request to analyze an update message, including at least an autonomous system number and a prefix;
   compare the update message to the plurality of historical networking information;
   generate a probability that the update message is valid based upon the comparison; and
   return the probability that the update message is valid to the router, wherein the router is configured to determine whether or not to propagate the update message based on the probability that the update message is valid.

2. The intelligent BGP device of claim 1, wherein the update message further includes routing information for the autonomous system number.

3. The intelligent BGP device of claim 2, wherein the probability that the update message is valid is based, at least in part, on the routing information.

4. The intelligent BGP device of claim 1, wherein the update message is a border gateway protocol update message.

5. The intelligent BGP device of claim 1, wherein the computer-executable instructions further cause the intelligent BGP device to update the plurality of historical networking information with the update message.

6. The intelligent BGP device of claim 1, wherein the computer-executable instructions further cause the intelligent BGP device to generate the probability that the update message is valid based on whether or not the prefix is found in the plurality of historical networking information.

7. The intelligent BGP device of claim 1, wherein the router is configured to determine whether or not to accept the update message based on the probability that the update message is valid.

8. A routing device for routing messages on a network, comprising:
   a transceiver configured for operable communication with at least one router and a routing analysis device of a communication network;
   a processor including a memory configured to store computer-executable instructions, which, when executed by the processor, cause the routing device to:
   store a plurality of message routing information;
   receive a routing update message from a router, wherein the routing update message includes a prefix and an autonomous system number;
   transmit at least a portion of the routing update message to the routing analysis device;
   receive, from the routing analysis device, a prediction result based on analysis of the routing update message including a probability that the routing update message is valid;
   determine whether or not to update the plurality of message routing information with the routing update message based on the probability that the routing update message is valid; and determine whether or not to propagate the routing update message based on the probability that the routing update message is valid.

9. The routing device of claim 8, wherein the computer-executable instructions further cause the routing device to:
store one or more routing policies; and
determine whether or not to update the plurality of message routing information based on the prediction result and the one or more routing policies.

10. The routing device of claim 8, wherein the prediction result includes a probability that the routing update message is valid.

11. The routing device of claim 8, wherein the routing update message is a first routing update message including a first prefix and a first autonomous system number, and wherein the computer-executable instructions further cause the routing device to:
receive a second routing update message including the first prefix and a second autonomous system number, wherein the first autonomous system number is different from the first autonomous system number; and
determine whether to update the plurality of message routing information with the first routing update message or the second routing update message.

12. The routing device of claim 11, wherein the computer-executable instructions further cause the routing device to:
receive a first prediction result for the first routing update message;
receive a second prediction result for the second routing update message; and
determine whether to update the plurality of message routing information with the first routing update message or the second routing update message based on the first prediction result and the second prediction result.

13. The routing device of claim 8, wherein the routing update message further includes routing information for the autonomous system number.

14. The routing device of claim 8, wherein to propagate the routing update message the computer-executable instructions further cause the routing device to:
update routing information associated with the routing update message; and
transmit the updated routing update message to one or more neighboring routing devices.

15. A method for routing messages on a network comprising:

storing a plurality of message routing information and a plurality of historical networking information;
receiving a routing update message from a router, wherein the routing update message includes a prefix and an autonomous system number;
comparing the routing update message to the plurality of historical networking information;
generating a probability that the routing update message is valid based upon the comparison;
determining whether or not to update the plurality of message routing information with the routing update message based on the probability that the routing update message is valid; and
determine whether or not to propagate the routing update message based on the probability that the routing update message is valid.

16. The method of claim 15, wherein the update message further includes routing information for the autonomous system number and wherein the probability that the update message is valid is based, at least in part, on the routing information.

17. The method of claim 15, wherein the update message is a border gateway protocol update message.

18. The method of claim 15 further comprising:
updating routing information associated with the routing update message; and
transmitting the updated routing update message to one or more neighboring routing devices.

19. The routing device of claim 8, wherein the computer-executable instructions further cause the routing device to transmit the routing update message to one or more adjacent neighboring devices based on a determination that the routing update message is valid.

20. The intelligent BGP device of claim 1, wherein the computer-executable instructions further cause the intelligent BGP device to:
compare the update message to the plurality of historical networking information including an amount of time that the prefix in the update message has been associated with the autonomous system number in the update message; and
generate a probability that the update message is valid based upon an amount of time that the prefix in the update message has been associated with the autonomous system number in the update message and the comparison.

* * * * *